(No Model.)
R. BROWN.
WHEEL FENDER FOR CARRIAGES.
No. 415,021. Patented Nov. 12, 1889.
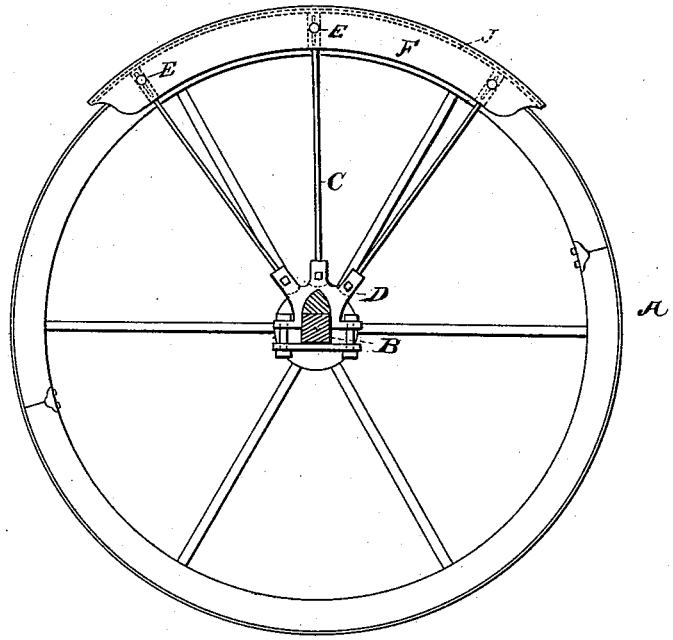
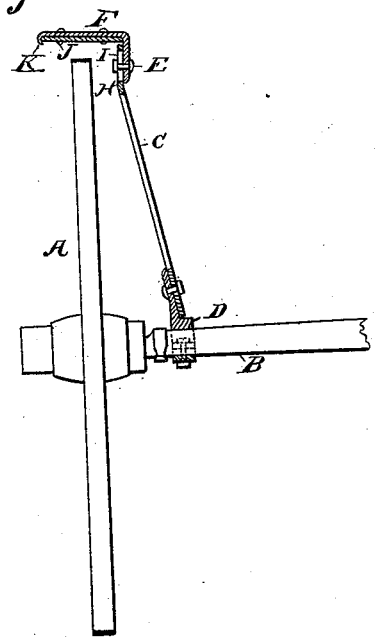
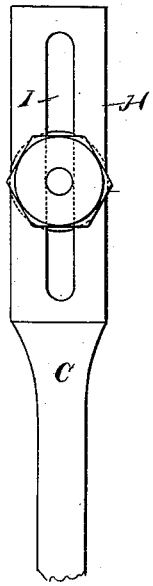
WITNESSES:
H. F. Ashton.
Mary Toykin
INVENTOR
Robert Brown,
BY E. W. Anderson,
ATTORNEY

UNITED STATES PATENT OFFICE.

ROBERT BROWN, OF MIAMISBURG, OHIO.

WHEEL-FENDER FOR CARRIAGES.

SPECIFICATION forming part of Letters Patent No. 415,021, dated November 12, 1889.

Application filed February 15, 1889. Serial No. 299,942. (No model.)

*To all whom it may concern:*

Be it known that I, ROBERT BROWN, a citizen of the United States, and a resident of Miamisburg, in the county of Montgomery and State of Ohio, have invented certain new and useful Improvements in Wheel-Fenders for Vehicles; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a side view of this invention. Fig. 2 is a vertical transverse section. Fig. 3 is a detail.

This invention has relation to mud guards or fenders for the wheels of vehicles; and it consists in the novel construction and combination of devices, as hereinafter set forth, and pointed out in the appended claims.

In the accompanying drawings, the letter A designates the wheel of a vehicle, and B the axle.

C designates an arm, the lower end of which is secured by a clip D to the axle, and when it is desired to provide a fender behind the front wheel to prevent mud from being thrown on the carriage-step the arm may be secured in position by the shaft-clip. The arm C extends from the wheel in the direction of that portion of said wheel to which the fender is to be applied, and it is provided with a short bolt and nut, as at E, to secure to said arm the adjustable head F, the shank H of which is slotted at I for the passage of said bolt. The head extends transversely across the rim of the wheel above, in front, or in rear, as the case may be, and to it is secured, by means of a short bolt or rivet, the fender board or guard J. The end of the transverse portion of the head E is downwardly hooked, as indicated at K, to engage the outer edge of the fender-board. This fender board or guard may be straight or curved, according to the design preferred.

Having described this invention, what I claim, and desire to secure by Letters Patent, is—

1. The wheel-fender having its securing-clip provided with an arm standing toward the wheel, and having its upper vertical portion provided with a vertical slot, and the head having bolt-connection through said slot with the arm, substantially as set forth.

2. The wheel-fender consisting of the securing-clip having radial projections, the radial arms secured to said projections, standing obliquely or toward the wheel, and having vertical portions provided with vertical slots, the head adjustably connected to the vertical portions of the arms, and the fender board or guard secured to said head, substantially as set forth.

In testimony whereof I affix my signature in presence of two witnesses.

ROBERT BROWN.

Witnesses:
LEWIS H. ZEHRING,
ZEBULON LEIS.